United States Patent
Yu et al.

(10) Patent No.: US 11,696,159 B2
(45) Date of Patent: Jul. 4, 2023

(54) METHOD, APPARATUS, AND NON-TRANSITORY COMPUTER READABLE MEDIUM FOR TESTING TERMINALS

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Lei-Tong Yu, Shenzhen (CN); Xue-Liang Xu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 166 days.

(21) Appl. No.: 17/366,375

(22) Filed: Jul. 2, 2021

(65) Prior Publication Data

US 2022/0345916 A1    Oct. 27, 2022

(30) Foreign Application Priority Data

Apr. 25, 2021  (CN) .......................... 202110449745.6

(51) Int. Cl.
  *H04W 24/08*   (2009.01)
  *H04B 17/00*   (2015.01)

(52) U.S. Cl.
  CPC ........ *H04W 24/08* (2013.01); *H04B 17/0085* (2013.01)

(58) Field of Classification Search
  CPC ............... H04W 24/08; H04W 52/245; H04B 17/0085; H04B 17/318; H04B 17/327; Y02D 30/70
  See application file for complete search history.

(56) References Cited

U.S. PATENT DOCUMENTS

| 6,259,675 B1 * | 7/2001 | Honda | H04L 43/00 370/248 |
| 6,339,356 B1 * | 1/2002 | Daughtry | H03H 7/255 327/314 |
| 7,006,447 B1 * | 2/2006 | Vaisanen | H04W 24/06 370/338 |

(Continued)

FOREIGN PATENT DOCUMENTS

EP    2811773 A1 * 12/2014 ........... H04W 16/32

*Primary Examiner* — Tejis Daya
(74) *Attorney, Agent, or Firm* — ScienBiziP, P.C.

(57) ABSTRACT

A method for testing terminals includes determining a quantity of terminals to be tested; testing each terminal to be tested in a testing environment and obtaining a quantity of testing results; each testing result includes an actual transmitting power and/or a receiving signal strength; obtaining a first fitting function based on the actual transmitting power, and/or obtaining a second fitting function based on the receiving signal strength; and controlling a target terminal to transmit signals, calculating an actual transmitting power of the target terminal by the first fitting function, and/or controlling the target terminal to receive signals, calculating a receiving signal strength of the target terminal by the second fitting function. A computer apparatus and a non-transitory computer readable medium for testing terminals are also disclosed.

15 Claims, 4 Drawing Sheets

(56) References Cited

U.S. PATENT DOCUMENTS

| | | | | |
|---|---|---|---|---|
| 2008/0224798 A1* | 9/2008 | Shafer | ............... | H01P 1/22 333/132 |
| 2010/0159863 A1* | 6/2010 | Moon | ............... | H03G 3/3052 455/234.1 |
| 2015/0256252 A1* | 9/2015 | Clouet | ............... | H04B 10/0775 398/38 |
| 2016/0044514 A1* | 2/2016 | Acharya | ............... | H04W 24/02 370/328 |

* cited by examiner

METHOD, APPARATUS, AND NON-TRANSITORY COMPUTER READABLE MEDIUM FOR TESTING TERMINALS

CROSS-REFERENCE TO RELATED APPLICATIONS

This application claims priority to Chinese Patent Application No. 202110449745.6 filed on Apr. 25, 2021, the contents of which are incorporated by reference herein.

FIELD

The subject matter herein generally relates to communication technology, and particularly to a method, an apparatus, and a non-transitory computer readable medium for testing terminals.

BACKGROUND

Nowadays, in the technology of testing mobile terminals, a mainboard and a precise testing device are widely used. However, the precise testing device is very expensive, the terminal and the precise testing device need to be calibrated multiple times, which costs a great deal of time and human resources. Additionally, a testing result may be inaccurate due to a missing or erroneous calibration or sudden non-performance of the precise testing device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Figure 1:
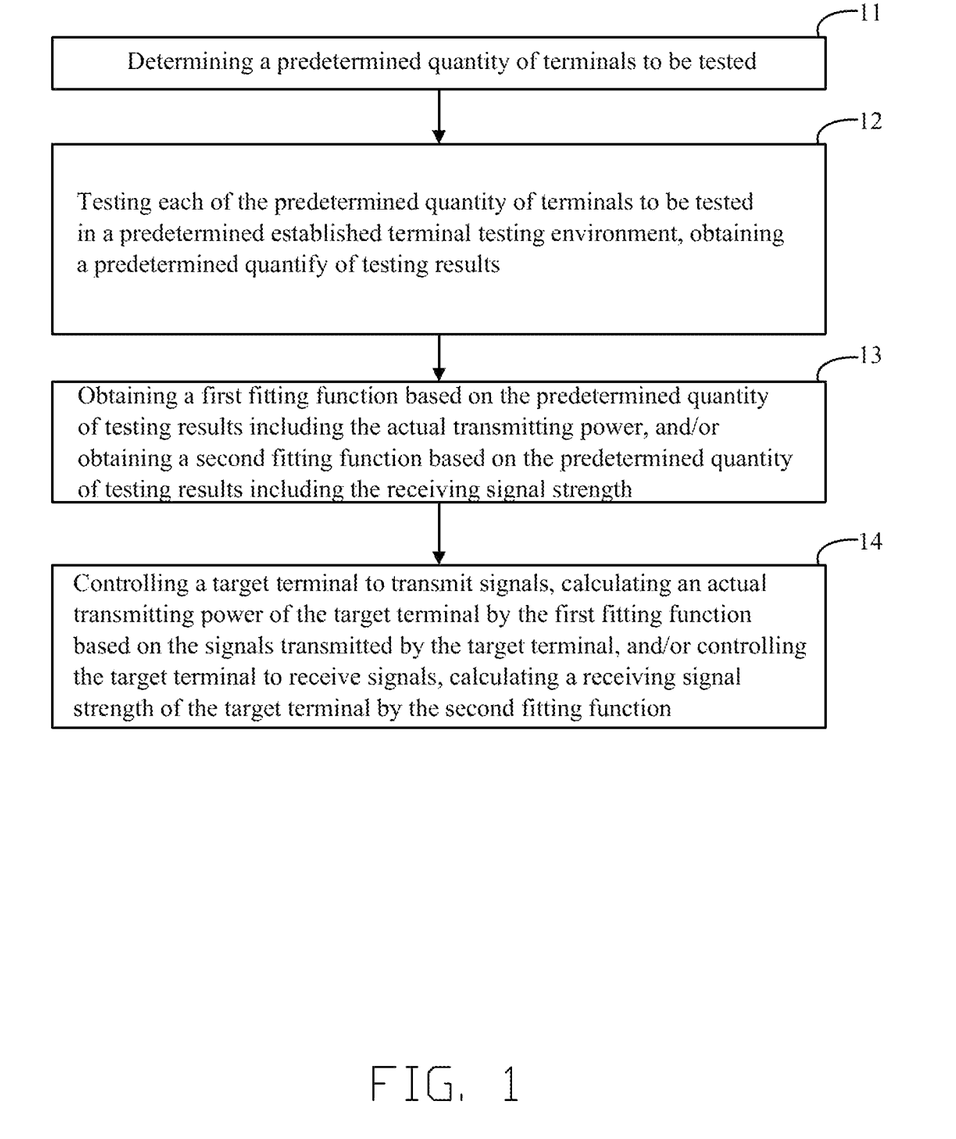
FIG. 1 illustrates a flowchart of an embodiment of a method for testing terminals.

FIG. 1 illustrates a flowchart of at least one embodiment of a method for testing terminals.

Figure 2:
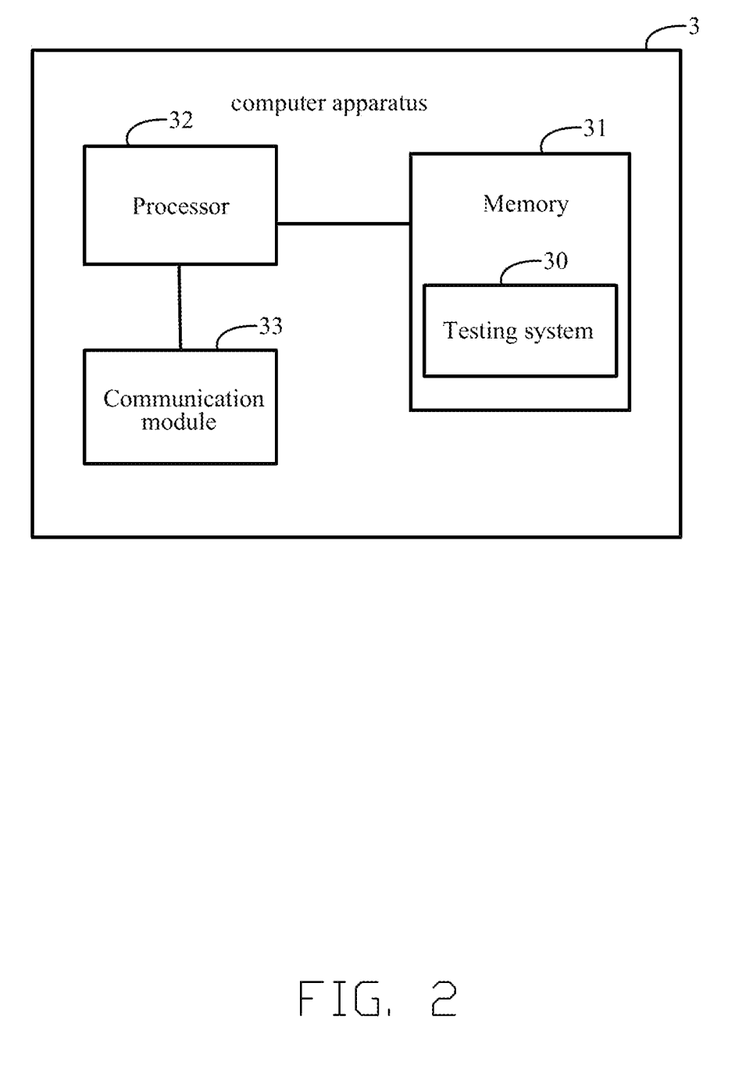
FIG. 2 is a schematic view of an embodiment of a computer apparatus.

In at least one embodiment, the method for testing terminals may be applied in a computer apparatus, such as a computer apparatus 3 showing in FIG. 2. The functions may be integrated in the computer apparatus for the method for testing terminals. In another embodiment, the method for testing terminals can be run in a form of software development kit in the computer apparatus.

The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, determining a predetermined quantity of terminals to be tested.

In at least one embodiment, the terminals to be tested can be mobile terminals, terminal mainboards, terminal chips, etc. The predetermined quantity of terminals to be tested, such as fifty terminal mainboards, are from one manufacturer, as from a same production batch, a same batch charge, a same production line, a same production shift, and a same characteristic or property, such as chip type, internal loss parameter, etc.

In another embodiment, when the manufacturer of the terminals to be tested is known, such as Qualcomm, Media Tek. Inc, etc., the computer apparatus can respond to input of the user, such as a chip type of each terminal to be tested, and can determine the predetermined quantity of terminals to be tested.

At block 12, testing each of the predetermined quantity of terminals to be tested in a predetermined established terminal testing environment, and obtaining a predetermined quantity of testing results. In the predetermined established terminal testing environment, a testing terminal 4, a first cable route 5, an attenuator 6, and a second cable route 7 (showing in FIG. 3) are connected in that order. Each of the testing results includes an actual transmitting power and/or a receiving signal strength of the terminal to be tested.

Figure 3:
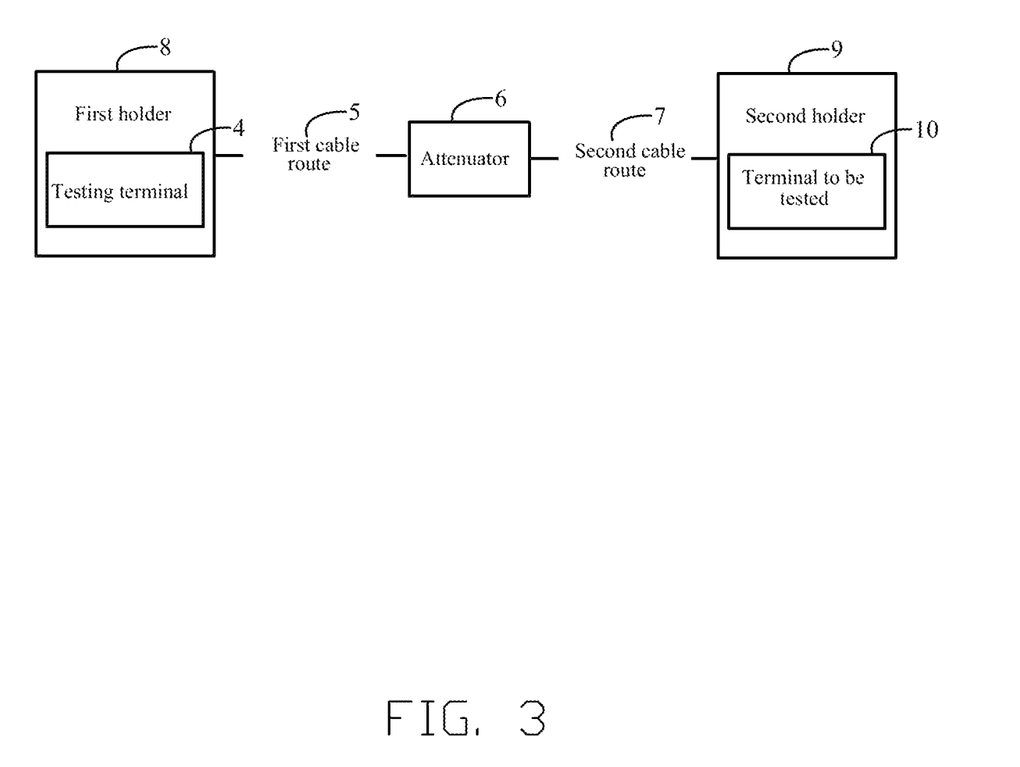
FIG. 3 illustrates an embodiment of a terminal testing environment for testing a terminal to be tested.

As shown in FIG. 3, in at least one embodiment, the testing terminal 4, the first cable route 5, the attenuator 6, and the second cable route 7 are connected in that order to form the predetermined established terminal testing environment. One end of the second cable route 7 is connected to the attenuator 6, the other end is configured to be connected to the terminal to be tested.

In at least one embodiment, the terminal which is administering the test (hereinafter "testing terminal") and the terminal to be tested have same properties and are in a same cable signal transmission protocol. The manufacturer of the testing terminal is known, such as Qualcomm, Media Tek. Inc, etc.

As shown in FIG. 3, in at least one embodiment, the testing terminal 4 is arranged on a first holder 8, which provides power for the testing terminal 4. The testing terminal 4 is connected to the first cable route 5 through route interfaces of the first holder 8. A terminal to be tested 10 is arranged on a second holder 9, which provides power for the terminal to be tested 10. The terminal to be tested 10 is connected to the second cable route 7 through route interfaces of the second holder 9. The first cable route 5 and the second cable route 7 can be radio frequency test lines, signal lines, etc.

In at least one embodiment, before testing each of the predetermined quantity of terminals to be tested in the predetermined established terminal testing environment, the method for testing terminals further includes detecting the first cable route 5, the second cable route 7, and the attenuator 6 using a network analyzer, obtaining a first attenuation value s1 of the first cable route 5, a second attenuation value s2 of the second cable route 7, and a third attenuation value s3 of the attenuator 6.

In at least one embodiment, each of the first attenuation value s1 and the second attenuation value s2 is a fixed value. A testing range of the terminal testing environment can be [−45 dB, 24 dB]. The attenuation value of the attenuator 6 can be adjusted to satisfy the testing range of the terminal testing environment. The third attenuation value s3 is a value adjusted according to the testing range of the terminal testing environment. A formula for calculating a total attenuation value s of the second cable route, the attenuator and the first cable route is s=s1+s2+s3, wherein each of the s1 and s2 is a fixed value.

In at least one embodiment, when testing one of the predetermined quantity of terminals to be tested in the predetermined established terminal testing environment, connecting the terminal to be tested to the second cable route through the second holder to form a terminal testing loop. Thereby, testing the terminal to be tested and obtaining a testing result of the terminal to be tested.

In detail, after testing one of the predetermined quantity of terminals to be tested, another terminal to be tested is placed to the second hold to replace the former one. Connecting the other terminal to be tested to the second cable route through the second holder to form a terminal testing loop. Therefore testing the other terminal to be tested. Repeating the process until testing every one of the predetermined quantity of terminals to be tested and obtaining the predetermined quantity of testing results.

In at least one embodiment, obtaining a predetermined quantity of first data, including controlling each of the predetermined quantity of terminals to be tested to transmit a first signal with a first initial transmitting power. The first signal is transmitted to the testing terminal after being attenuated by the second cable route, the attenuator, and the first cable route.

In at least one embodiment, after the first signal is transmitted to the testing terminal, the first signal may be further attenuated by an internal loss of the testing terminal. When the testing terminal receives the first signal, a first signal parameter may be obtained by the user from a signal instruction set of a baseband chip manufacturer of the testing terminal. The first signal parameter may be a signal power of the first signal received by the testing terminal, such as an actual transmitting power y of the first signal.

In at least one embodiment, when the terminal to be tested transmits the first signal, storing a first initial transmitting power x0 to a register. For instance, when x0=24 dBm, a value stored to the register of the terminal to be tested is 18 Hex after conversion into hexadecimal form. When the testing terminal receives the first signal, storing the first signal parameter, such as the actual transmitting power y of the first signal, to the register in response to user's operation.

In at least one embodiment, obtaining the first initial transmitting power x0 from the register of the terminal to be tested and the actual transmitting power y of the first signal from the register of the testing terminal, and then storing the first initial transmitting power x0 and the actual transmitting power y as the first data. In detail, the first data can be stored after conversion into decimal form.

In at least one embodiment, obtaining a predetermined quantity of second data, including controlling each testing terminal to transmit a second signal with a second initial transmitting power t0. The second signal is transmitted to the each of the predetermined quantity of terminals to be tested after being attenuated by the first cable route, the attenuator, and the second cable route.

In at least one embodiment, after the second signal is transmitted to the terminal to be tested, the second signal may be further attenuated by an internal loss of the terminal to be tested. When the terminal to be tested receives the second signal, a second signal parameter may be obtained by the user from a signal instruction set of a baseband chip manufacturer of the terminal to be tested. The second signal parameter may be a signal power of the second signal received by the terminal to be tested, such as a receiving power strength f of the second signal.

In at least one embodiment, when the testing terminal transmits the second signal, storing a second initial transmitting power t0 to the register of itself. For instance, when t0=15 dBm, a value stored to the register of the testing terminal is 0 FHex after conversion into hexadecimal form. When the terminal to be tested receives the second signal, storing the second signal parameter, such as the receiving power strength f of the second signal, to the register of itself in response to user's operation.

In at least one embodiment, obtaining the second initial transmitting power t0 from the register of the testing terminal and the receiving power strength f from the register of the terminal to be tested, and then storing the second initial transmitting power t0 and the receiving power strength f as the second data. In details, the second data can be stored after conversion into decimal form.

In at least one embodiment, the testing results of each of the predetermined quantity of terminals to be tested include the first data and/or the second data obtained by testing each of the predetermined quantity of terminals to be tested.

At block 13, obtaining a first fitting function based on the predetermined quantity of testing results including the actual transmitting power, and/or obtaining a second fitting function based on the predetermined quantity of testing results including the receiving signal strength.

In at least one embodiment, obtaining the first fitting function by fitting the predetermined quantity of first data according to a first rule. The first rule includes for each of the predetermined quantity of terminal to be tested, calculating attenuated power x of each of the first signal received by the testing terminal after attenuation by the second cable route, the attenuator, and the first cable route. A formula for calculating the attenuated power x is x=x0−s. Therefore, obtaining a predetermined quantity of attenuated powers x after testing the predetermined quantity of terminal to be tested.

Setting the attenuated power x as a first independent variable, setting the actual transmitting power y as a first dependent variable corresponding to the first independent variable x, and fitting the actual transmitting power y and the attenuated power x, including marking a point at a (x, y) in a xoy coordinate system. In at least one embodiment, the point marked can be represented as a first target point. Wherein the o is an origin of coordinate system. Marking a predetermined quantity of first target points in the xoy coordinate system. Determining a linear relation of the attenuated power x and the actual transmitting power y according to arrangements of the predetermined quantity of first target points. Selecting a line L1 with the best fitting result, such as a line with the most of the first target points, from fitting lines of fitting the predetermined quantity of first target points. Obtaining a parameter formula: y(x)=M*x+N, of the line L1 by calculating the first target points on the line L1. Wherein the M and N are known parameters. The parameter formula y(x) of the line L1 is the first fitting function. The first fitting function can be represented as y=M*(x0−s)+N or y=M*(x0−s1−s2−s3)+N. The M and N are internal loss parameters of the testing terminals. Since the first fitting function is a linear formula, obtaining values of the M and N by coordinates of two first target points in the xoy coordinate system. The greater the quantity of the first target points, the more precise the fitting results will be. In other embodiments, when testing the terminals to be tested with other items, such as testing a memory frequency and/or a temperature of the mainboard, the first fitting function can be a multiple equation.

In at least one embodiment, obtaining a second fitting function by fitting the predetermined quantity of second data according to a second rule. The second rule includes calculating an attenuated power t of the second signal received by each of the predetermined quantity of terminals to be tested after attenuation by the first cable route, the attenuator, and the second cable route. A formula for calculating the attenuated power t can be t=t0−s. Therefore, obtaining a predetermined quantity of attenuated powers t after testing the predetermined quantity of terminal to be tested.

Setting the attenuated power t as a second independent variable, setting the receiving signal strength f as a second dependent variable corresponding to the second independent variable t, and fitting the receiving signal strength f and the attenuated power t, including marking a point at a (t, f) in a tOf coordinate system. In at least one embodiment, the point marked can be represented as a second target point. Wherein O is an origin of this coordinate system. Marking a predetermined quantity of second target points in the tOf coordinate system. Determining a linear relation of the attenuated power t and the receiving signal strength f according to arrangements of the predetermined quantity of second target points. Selecting a line L2 with the best fitting result, such as a line with the most of the second target points, from fitting lines of fitting the predetermined quantity of second target points. Obtaining a parameter formula: f(t)=P*t+Q, of the line L2 by calculating the second target points on the line L2. Wherein the P and Q are known parameters. The parameter formula f(t) of the line L2 is the second fitting function. The second fitting function can be represented as f=P*(t0−s)+Q or f=P*(t0−s1−s2−s3)+Q. P and Q are internal loss parameters of the terminals to be tested. Since the second fitting function is a linear formula, obtaining values of the P and Q by coordinates of two second target points in the tOf coordinate system. The greater the quantity of the second target points, the more precise the fitting results will be. In other embodiments, when testing the terminals to be tested with other items, such as testing a memory frequency and/or a temperature of the mainboard, the second fitting function can be a multiple equation.

At block 14, controlling a target terminal to transmit signals, calculating an actual transmitting power of the target terminal by the first fitting function based on the signals transmitted by the target terminal, and/or controlling the target terminal to receive signals, calculating a receiving signal strength of the target terminal by the second fitting function.

Figure 4:
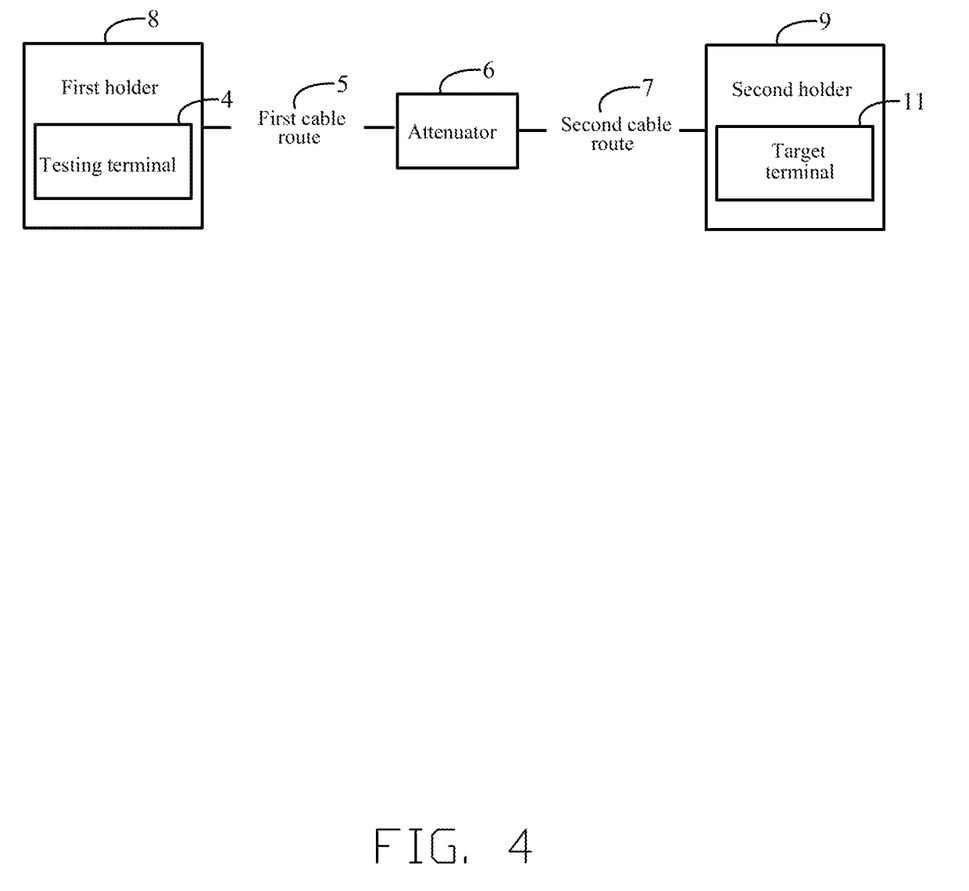
FIG. 4 illustrates an embodiment of a terminal testing environment for testing a target terminal.

In at least one embodiment, the target terminal and the predetermined quantity of terminals to be tested, such as fifty mainboards, are from one manufacturer, a same production batch, such as a same batch charge, a same production line, a same production shift, and a same property, such as chip type, internal loss parameter, etc. When testing the target terminal in the terminal testing environment, as shown in FIG. 4, a target terminal 11 can be connected to the second cable route 7 through the second holder 9 to form a terminal testing loop. Therefore testing the target terminal 11. The target terminal can be a mobile terminal, a terminal mainboard, a terminal chip, etc.

In at least one embodiment, controlling the target terminal to transmit a third signal with a third initial transmitting power x10. The third signal is transmitted to the testing terminal after being attenuated by the second cable route, the attenuator, and the first cable route. An attenuated power x1 of the third signal can be x1=x10−s. Therefore, obtaining an actual transmitting power y1, y1=M*x1+N, of the third signal of the target terminal according to the first fitting function.

In at least one embodiment, controlling the testing terminal to transmit a fourth signal with a fourth initial transmitting power t10. The fourth signal is transmitted to the target terminal after being attenuated by the first cable route, the attenuator, and the second cable route. An attenuated power t1 of the fourth signal can be t1=t10−s. Therefore, obtaining receiving power strength f1, f1=P*t1+Q, of the fourth signal of the target terminal according to the second fitting function.

FIG. 2 illustrates a computer apparatus which can perform a method for testing terminals as shown in FIG. 1.

FIG. 2 is a schematic view of at least one embodiment of a computer apparatus 3 including a memory 31, at least one processor 32, and a communication module 33. In at least one embodiment, a structure of the computer apparatus is not limited to that shown in FIG. 2, the computer apparatus can be in bus configuration or in star configuration. The computer apparatus 3 can include more hardwares, softwares, and other necessary elements.

In at least one embodiment, the computer apparatus 3 includes instructions which can be predetermined and stored and elements can automatically calculate data and/or process information.

In at least one embodiment, the memory 31 can include various types of non-transitory computer-readable storage mediums. For example, the memory 31 can store local paths and the testing system 30. The memory 31 can rapidly and automatically access instructions and data when the computer apparatus 3 is running. The memory 31 can be an internal storage system, such as a flash memory, a Random Access Memory (RAM) for the temporary storage of information, and/or a Read-Only Memory (ROM), a Programmable Read-Only Memory (PROM), Erasable Programmable Read-Only Memory (EPROM), a One-time Programmable Read-Only Memory (OTPROM), Electrically-Erasable Programmable Read-Only Memory (EEPROM), Compact Disc Read-Only Memory (CD-ROM) for permanent storage of information. The memory 31 can also be an external storage system, such as a hard disk, a storage card, or a data storage medium.

In at least one embodiment, the at least one processor 32 can be formed by integrated circuits, such as an individual integrated circuit or multiple integrated circuits with a same function or different functions. The at least one processor 32 includes but is not limited to a central processing unit (CPU), a microprocessor, a digital signal processor (DSP), a graphics processor, an application specific integrated circuit (ASIC), a field-programmable gate array (FPGA), a data processor chip, a programable logic device (PLD), a discrete gate/transistor logic device, or a discrete hardware component. The processor 32 may be a control unit and electrically connected to other elements of the computer apparatus 3 through interfaces or a bus. In at least one embodiment, the computer apparatus 3 includes a plurality of interfaces configured to communicate with other medical apparatus and receive medical image data from the medical apparatus. In at least one embodiment, the various types of non-transitory computer-readable storage mediums stored in the memory 21 can be processed by the at least one processor 32 to perform various of functions, such as the method for testing terminals as shown in FIG. 1.

In at least one embodiment, the testing system 30 is applied in the computer apparatus 3. The testing system 30 can be non-transitory computer program medium stored in the memory 31 and processed by the least one processor 32 to perform the method for testing terminals as shown in FIG. 1.

In at least one embodiment, the communication module 33 can be a WI-FI module. The computer apparatus 3 can control the testing terminal 4, the terminal to be tested 10, and the target terminal 11 to transmit signals according to the communication module 33. The computer apparatus 3 can obtain data, such as the first initial transmitting power x0 and the second initial transmitting power t0, from the registers of the testing terminal 4 and the terminal to be tested 10 through the communication module 33.

In at least one embodiment, the computer apparatus 3 further includes a power source (not shown) for every element. The power source may be electrically connected to the at least one processor 32 through a power management device and configured to charge, discharge, and manage power dissipation. The power source may include one or more direct current or alternating current power supply, rechargeable device, power malfunction detection circuit, power adapter or inverter, power indicator. The computer apparatus 3 further includes various of sensors, bluetooth modules, etc.

A non-transitory computer-readable storage medium including program instructions for causing the computer apparatus to perform the method for testing terminals is also disclosed.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for testing terminals comprising:
    determining a predetermined quantity of terminals to be tested;
    detecting a first cable route, a second cable route, and an attenuator using a network analyzer;
    obtaining a first attenuation value s1 of the first cable route, a second attenuation value s2 of the second cable route, and a third attenuation value s3 of the attenuator;
    testing each of the predetermined quantity of terminals to be tested in a predetermined established terminal testing environment and obtaining a predetermined quantity of testing results; wherein each of the testing results comprises an actual transmitting power and/or a receiving signal strength of the terminal to be tested, in the predetermined established terminal testing environment, the testing terminal, the first cable route, the attenuator, and a second cable route being connected in that order;
    obtaining a first fitting function based on the predetermined quantity of testing results comprising the actual transmitting power, and/or obtaining a second fitting function based on the predetermined quantity of testing results comprising the receiving signal strength; and
    controlling a target terminal to transmit signals, calculating an actual transmitting power of the target terminal by the first fitting function based on the signals transmitted by the target terminal, and/or controlling the target terminal to receive signals, calculating a receiving signal strength of the target terminal by the second fitting function.

2. The method according to claim 1, wherein the predetermined quantity of terminals to be tested and the target terminal have a same property and are in a same cable signal transmission protocol.

3. The method according to claim 1, further comprising:
    calculating a total attenuation value s of the second cable route, the attenuator and the first cable route, wherein the total attenuation value s is calculated by a calculation formula of $s=s1+s2+s3$.

4. The method according to claim 3, wherein the testing each of the predetermined quantity of terminals to be tested in a predetermined established terminal testing environment and obtaining a predetermined quantity of testing results comprises:
    obtaining a predetermined quantity of first data, comprising controlling each of the predetermined quantity of terminals to be tested to transmit a first signal with a first initial transmitting power x0, the testing terminal receives each of the first signal attenuated by the second cable route, the attenuator, and the first cable route; obtaining an actual transmitting power y of the first signal of each of the predetermined quantity of terminals to be tested, and determining the first initial transmitting power x0 and the actual transmitting power y as a first data; and/or obtaining a predetermined quantity of second data, comprising controlling the testing terminal to transmit a second signal with a second initial transmitting power t0, each of the terminals to be tested receives the second signal attenuated by the first cable route, the attenuator, and the second cable route; obtaining a receiving signal strength f of the second signal of each of the terminals to be tested, and determining the second initial transmitting power tO and the receiving signal strength f as a second data.

5. The method according to claim 4, wherein the obtaining an actual transmitting power y of the first signal of each of the predetermined quantity of terminals to be tested comprises: when the testing terminal receives the first signal, obtaining a first signal parameter of the testing terminal in response to user's operation, the first signal parameter comprises the actual transmitting power y of the first signal; and/or the obtaining a receiving signal strength f of the second signal of each of the terminals to be tested comprises: when the terminal to be tested receives the second signal, obtaining a second signal parameter of the terminal to be tested, the second signal parameter comprises the receiving signal strength f of the second signal.

6. The method according to claim 4, wherein the obtaining a first fitting function based on the predetermined quantity of testing results comprising the actual transmitting power comprises:

obtaining the first fitting function by fitting the predetermined quantity of first data according to a first rule; the first rule comprises:

calculating attenuated power x of each of the first signal received by testing terminal after being attenuated by the second cable route, the attenuator, and the first cable route, a formula for calculating the attenuated power x is x=x0−s;

setting the attenuated power x as a first independent variable, setting the actual transmitting power y as a first dependent variable corresponding to the first independent variable x, and fitting the actual transmitting power y and the attenuated power x; and/or;

the obtaining a second fitting function based on the predetermined quantity of testing results comprising the receiving signal strength comprises:

obtaining a second fitting function by fitting the predetermined quantity of second data according to a second rule; the second rule comprises;

calculating an attenuated power t of the second signal received by each of the predetermined quantity of terminals to be tested after being attenuated by the first cable route, the attenuator, and the second cable route, a formula for calculating the attenuated power t is t=t0−s;

setting the attenuated power t as a second independent variable, setting the receiving signal strength f as a second dependent variable corresponding to the second independent variable t, and fitting the receiving signal strength f and the attenuated power t.

7. The method according to claim 6, wherein the controlling a target terminal to transmit signals, calculating an actual transmitting power of the target terminal by the first fitting function based on the signals transmitted by the target terminal comprises:

controlling the target terminal to transmit a third signal with a third initial transmitting power, the testing terminal receives the third signal attenuated by the second cable route, the attenuator, and the first cable route, obtaining an actual transmitting power of the third signal of the target terminal according to the first fitting function; and/or the controlling the target terminal to receive signals, calculating a receiving signal strength of the target terminal by the second fitting function comprises:

controlling the testing terminal to transmit a fourth signal with a fourth initial transmitting power, the target terminal receives the fourth signal attenuated by the first cable route, the attenuator, and the second cable route, obtaining receiving power strength of the fourth signal of the target terminal according to the second fitting function.

8. A computer apparatus for testing terminals comprising:
at least one processor; and
at least one memory coupled to the at least one processor and storing program instructions; the memory and the program instructions configured to, with the at least one processor, cause the computer apparatus to perform:

determining a predetermined quantity of terminals to be tested;

detecting a first cable route, a second cable route, and an attenuator using a network analyzer;

obtaining a first attenuation value s1 of the first cable route, a second attenuation value s2 of the second cable route, and a third attenuation value s3 of the attenuator;

testing each of the predetermined quantity of terminals to be tested in a predetermined established terminal testing environment and obtaining a predetermined quantity of testing results; wherein each of the testing results comprises an actual transmitting power and/or a receiving signal strength of the terminal to be tested, in the predetermined established terminal testing environment, the testing terminal, the first cable route, the attenuator, and a second cable route being connected in that order;

obtaining a first fitting function based on the predetermined quantity of testing results comprising the actual transmitting power, and/or obtaining a second fitting function based on the predetermined quantity of testing results comprising the receiving signal strength; and controlling a target terminal to transmit signals, calculating an actual transmitting power of the target terminal by the first fitting function based on the signals transmitted by the target terminal, and/or controlling the target terminal to receive signals, calculating a receiving signal strength of the target terminal by the second fitting function.

9. The computer apparatus according to claim 8, wherein the predetermined quantity of terminals to be tested and the target terminal have a same property and are in a same cable signal transmission protocol.

10. The computer apparatus according to claim 8, wherein the memory and the program instructions configured to, with the at least one processor, cause the apparatus further to perform:

calculating a total attenuation value s of the second cable route, the attenuator and the first cable route, wherein the total attenuation value s is calculated by a calculation formula of s=s1+s2+s3.

11. The computer apparatus according to claim 10, wherein the testing each of the predetermined quantity of terminals to be tested in a predetermined established terminal testing environment and obtaining a predetermined quantity of testing results comprises:

obtaining a predetermined quantity of first data, comprising controlling each of the predetermined quantity of terminals to be tested to transmit a first signal with a first initial transmitting power x0, the testing terminal receives the first signal attenuated by the second cable route, the attenuator, and the first cable route; obtaining an actual transmitting power y of the first signal of each of the predetermined quantity of terminals to be tested, and determining the first initial transmitting power x0 and the actual transmitting power y as a first data; and/or obtaining a predetermined quantity of second data, comprising controlling the testing terminal to transmit a second signal with a second initial transmitting power t0, each of the terminals to be tested receives the second signal attenuated by the first cable route, the attenuator, and the second cable route; obtaining a receiving signal strength f of the second signal of each of the terminals to be tested, and determining the second initial transmitting power t0 and the receiving signal strength f as a second data.

12. The computer apparatus according to claim 11, wherein the obtaining an actual transmitting power y of the first signal of each of the predetermined quantity of terminals to be tested comprises: when the testing terminal receives the first signal, obtaining a first signal parameter of the testing terminal in response to user's operation, the first signal parameter comprises the actual transmitting power y of the first signal; and/or the obtaining a receiving signal strength f of the second signal of each of the terminals to be tested comprises: when the terminal to be tested receives the second signal, obtaining a second signal parameter of the terminal to be tested, the second signal parameter comprises the receiving signal strength f of the second signal.

13. The computer apparatus according to claim 11, wherein the obtaining a first fitting function based on the predetermined quantity of testing results comprising the actual transmitting power comprises:

obtaining the first fitting function by fitting the predetermined quantity of first data according to a first rule; the first rule comprises:

calculating attenuated power x of each of the first signal received by testing terminal after being attenuated by the second cable route, the attenuator, and the first cable route, a formula for calculating the attenuated power x is $x=x0-s$;

setting the attenuated power x as a first independent variable, setting the actual transmitting power y as a first dependent variable corresponding to the first independent variable x, and fitting the actual transmitting power y and the attenuated power x; and/or;

the obtaining a second fitting function based on the predetermined quantity of testing results comprising the receiving signal strength comprises:

obtaining a second fitting function by fitting the predetermined quantity of second data according to a second rule; the second rule comprises:

calculating an attenuated power t of the second signal received by each of the predetermined quantity of terminals to be tested after being attenuated by the first cable route, the attenuator, and the second cable route, a formula for calculating the attenuated power t is $t=t0-s$;

setting the attenuated power t as a second independent variable, setting the receiving signal strength f as a second dependent variable corresponding to the second independent variable t, and fitting the receiving signal strength f and the attenuated power t.

14. The computer apparatus according to claim 13, wherein the controlling a target terminal to transmit signals, calculating an actual transmitting power of the target terminal by the first fitting function based on the signals transmitted by the target terminal comprises:

controlling the target terminal to transmit a third signal with a third initial transmitting power, the testing terminal receives the third signal attenuated by the second cable route, the attenuator, and the first cable route, obtaining an actual transmitting power of the third signal of the target terminal according to the first fitting function; and/or the controlling the target terminal to receive signals, calculating a receiving signal strength of the target terminal by the second fitting function comprises:

controlling the testing terminal to transmit a fourth signal with a fourth initial transmitting power, the target terminal receives the fourth signal attenuated by the first cable route, the attenuator, and the second cable route, obtaining receiving power strength of the fourth signal of the target terminal according to the second fitting function.

15. A non-transitory computer readable medium comprising program instructions for causing a computer apparatus to perform at least the follow:

determining a predetermined quantity of terminals to be tested;

detecting a first cable route, a second cable route, and an attenuator using a network analyzer;

obtaining a first attenuation value s1 of the first cable route, a second attenuation value s2 of the second cable route, and a third attenuation value s3 of the attenuator;

testing each of the predetermined quantity of terminals to be tested in a predetermined established terminal testing environment and obtaining a predetermined quantity of testing results; wherein each of the testing results comprises an actual transmitting power and/or a receiving signal strength of the terminal to be tested, in the predetermined established terminal testing environment, the testing terminal, the first cable route, the attenuator, and a second cable route being connected in that order;

obtaining a first fitting function based on the predetermined quantity of testing results comprising the actual transmitting power, and/or obtaining a second fitting function based on the predetermined quantity of testing results comprising the receiving signal strength; and controlling a target terminal to transmit signals, calculating an actual transmitting power of the target terminal by the first fitting function based on the signals transmitted by the target terminal, and/or controlling the target terminal to receive signals, calculating a receiving signal strength of the target terminal by the second fitting function.

* * * * *